United States Patent
Miyoshi et al.

(10) Patent No.: US 6,996,339 B2
(45) Date of Patent: Feb. 7, 2006

(54) THREE-DIMENSIONAL PHOTOGRAPHING APPARATUS AND THREE-DIMENSIONAL PHOTOGRAPHING METHOD, AND STEREO ADAPTER

(75) Inventors: Takashi Miyoshi, Atsugi (JP); Akio Kosaka, Hachioji (JP); Kazuhiko Arai, Hachioji (JP); Kazuhiko Takahashi, Hachioji (JP); Hidekazu Iwaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 64 days.

(21) Appl. No.: 10/680,504

(22) Filed: Oct. 7, 2003

(65) Prior Publication Data

US 2004/0081445 A1 Apr. 29, 2004

(30) Foreign Application Priority Data

Oct. 10, 2002 (JP) .................................... 2002-297537

(51) Int. Cl.
*G03B 35/00* (2006.01)

(52) U.S. Cl. ...................... 396/175; 396/331
(58) Field of Classification Search ................ 396/324, 396/325, 331, 175; 348/42, 47, 49, 136; 356/603–605; 382/154

See application file for complete search history.

(56) References Cited

U.S. PATENT DOCUMENTS

| 4,842,411 | A | | 6/1989 | Wood .............................. 356/2 |
|---|---|---|---|---|
| 4,858,157 | A | * | 8/1989 | Murai et al. ................. 382/154 |
| 5,561,526 | A | * | 10/1996 | Huber et al. ................. 356/604 |
| 6,028,672 | A | | 2/2000 | Geng .......................... 356/376 |
| 6,493,095 | B1 | | 12/2002 | Song et al. .................. 356/603 |
| 2001/0014171 | A1 | | 8/2001 | Iijima et al. ................. 382/154 |
| 2002/0118970 | A1 | * | 8/2002 | Miyoshi ...................... 396/324 |
| 2003/0072570 | A1 | * | 4/2003 | Seo ............................ 396/331 |

FOREIGN PATENT DOCUMENTS

| CA | 2267519 | 10/2000 |
|---|---|---|
| EP | 1 431 803 A2 | 6/2004 |
| JP | 63-298115 | 12/1988 |
| JP | 4-150493 | 5/1992 |
| JP | 6-249628 | 9/1994 |
| JP | 8-50018 | 2/1996 |
| JP | 9-200604 | 7/1997 |
| JP | 2002-148687 | 5/2002 |
| JP | 2002-236332 | 8/2002 |
| WO | WO 00/27131 | 5/2000 |

OTHER PUBLICATIONS

Okutomi, M., "Computer Vision: Technical Comments amd Future Prospects", Shingijutsu Communications, Chapter 8, pp. 124–133, 1998.

\* cited by examiner

*Primary Examiner*—W. B. Perkey
(74) *Attorney, Agent, or Firm*—Scully, Scott Murphy & Presser

(57) ABSTRACT

A three-dimensional photographing apparatus includes a photographing unit configured to photograph an object from a plurality of viewpoints and a projecting unit configured to project a pattern on the object in photographing. The projecting unit including an optical system having a projection view angle. The projection view angle of the optical system falls within a range where the photographing unit photographs the object and is set so as to project the pattern on an overlapped area which is formed by overlapping photographing spaces capable of photographing the object from the viewpoints.

25 Claims, 6 Drawing Sheets

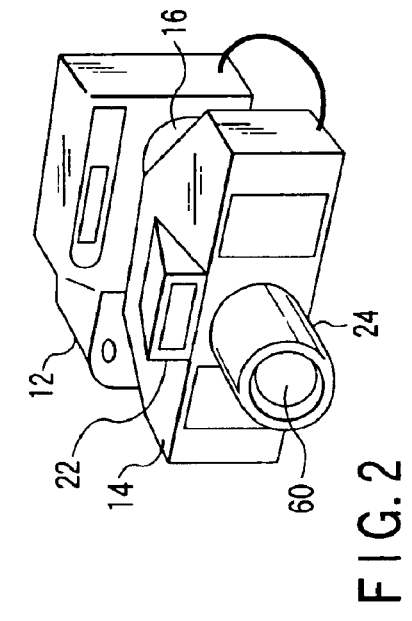
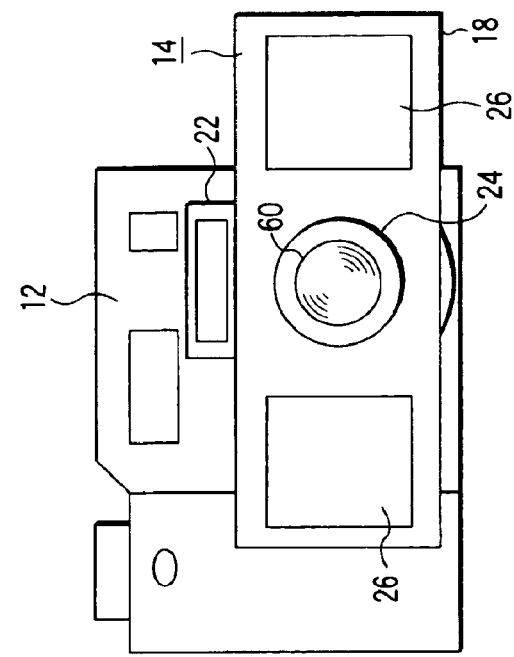
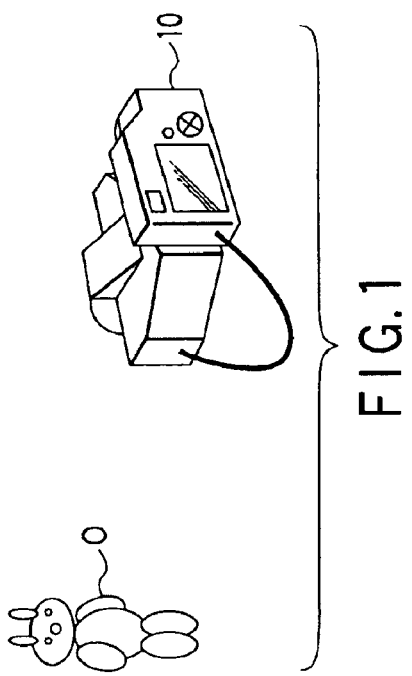
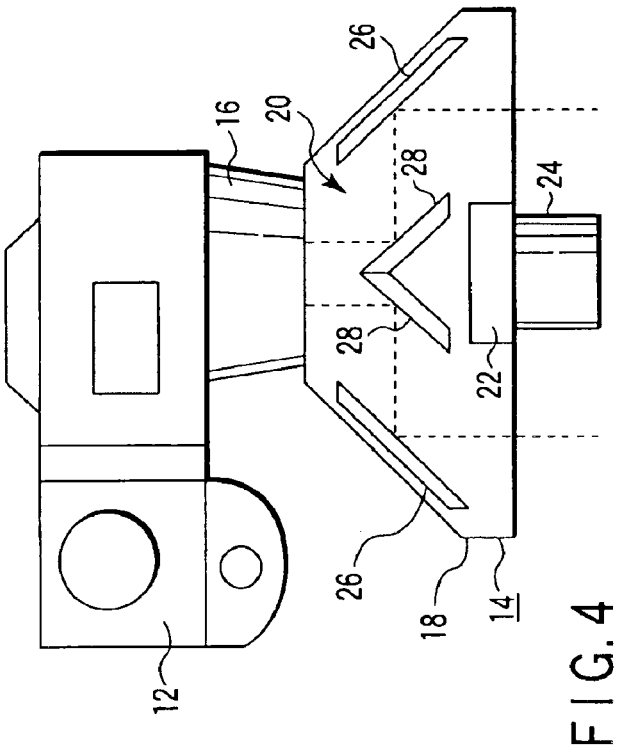

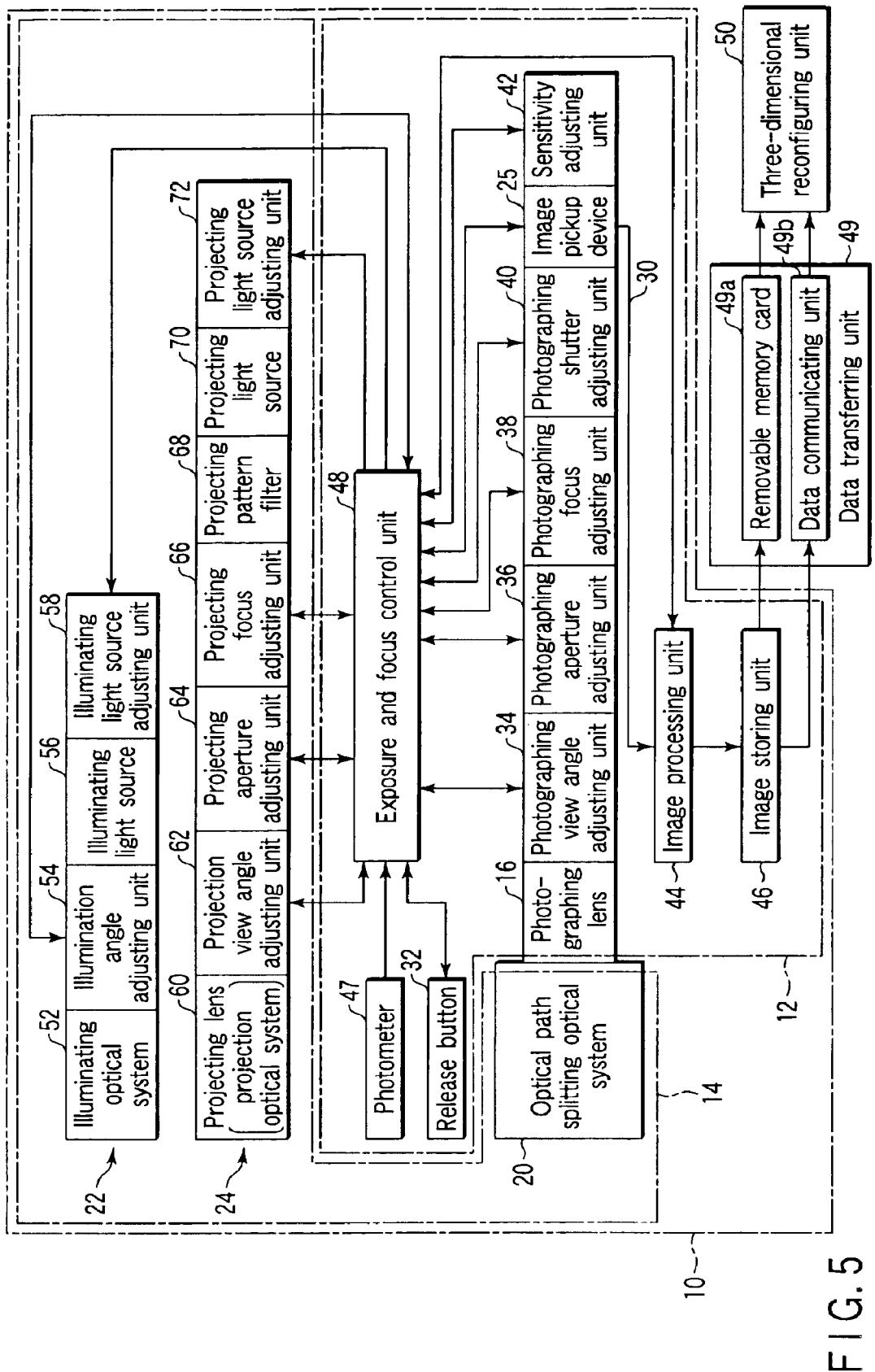
F I G. 5

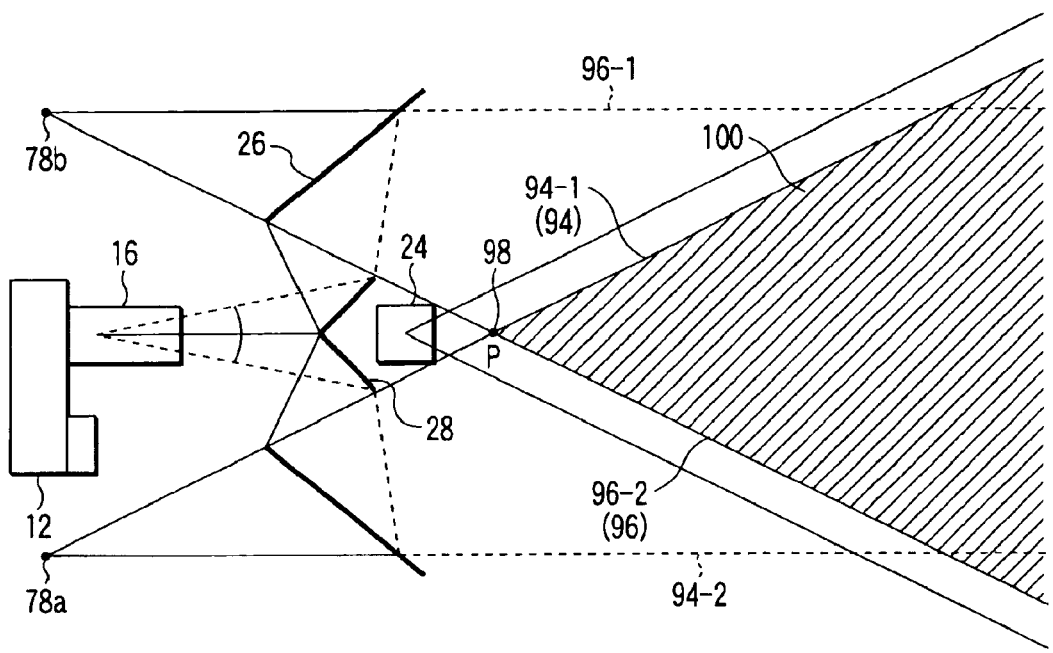
FIG. 16
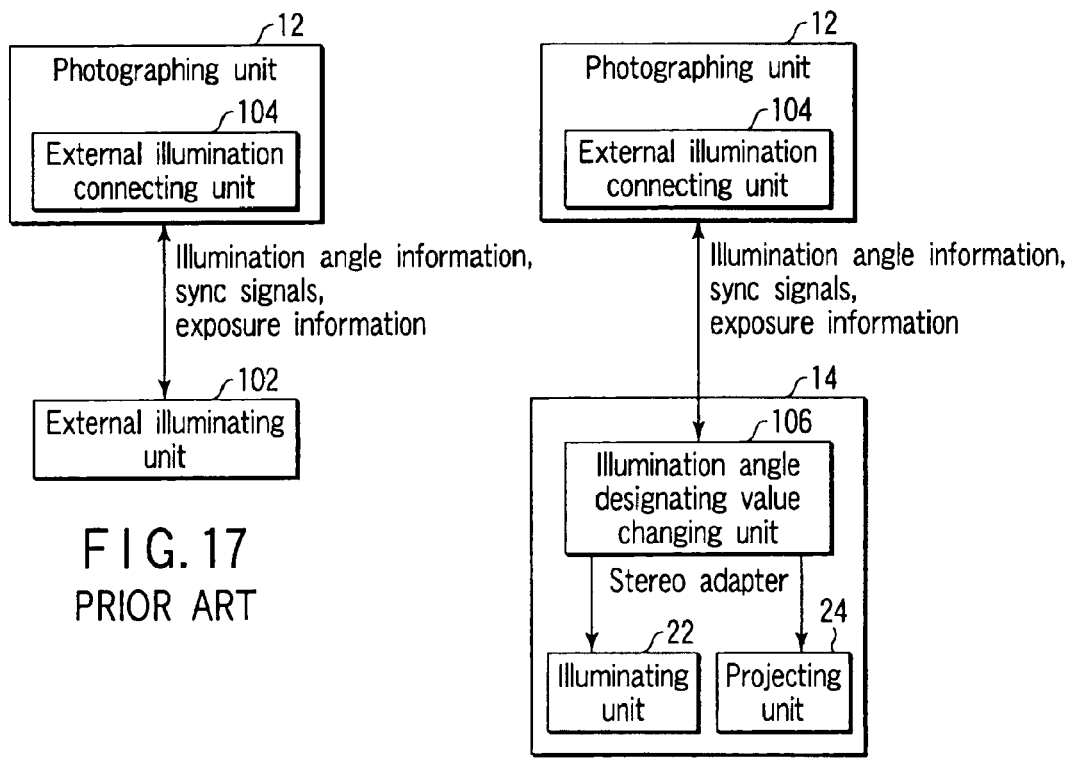
FIG. 17
PRIOR ART
FIG. 18

THREE-DIMENSIONAL PHOTOGRAPHING APPARATUS AND THREE-DIMENSIONAL PHOTOGRAPHING METHOD, AND STEREO ADAPTER

CROSS-REFERENCE TO RELATED APPLICATIONS

This application is based upon and claims the benefit of priority from the prior Japanese Patent Application No. 2002-297537, filed Oct. 10, 2002, the entire contents of which are incorporated herein by reference.

BACKGROUND OF THE INVENTION

1. Field of the Invention

The present invention relates to a three-dimensional photographing apparatus for photographing an object from a plurality of viewpoints, which is used to measure a three-dimensional shape of the object and a three-dimensional photographing method for doing the same, and a stereo adapter that is connected to a photographing apparatus to allow an object to be photographed from a plurality of viewpoints.

2. Description of the Related Art

M. Okutomi, "Computer Vision: Technical Comments and Future Prospects," Shingijutsu Communications, chapter 8, 1998 discloses a stereo vision (stereophotographing) technique of picking up images of an object from different viewpoints, obtaining a correspondence between points in the images of the object, and computing a distance to the object according to the principle of triangulation.

Jpn. Pat. Appln. KOKAI Publication No. 6-249628 discloses a stereo (stereophotographing) technique of projecting a pattern on an object to obtain a correspondence between respective points of the object correctly and easily.

Jpn. Pat. Appln. KOKAI Publication No. 2002-236332 discloses a stereo adapter that is connected to a photographing optical system of a photographing apparatus. The adapter receives light from one object through two separate sections and guides it to the photographing optical system to allow a parallax image to be photographed (stereophotographed). This Publication also discloses a stereo adapter including a light-emitting unit capable of emitting light to illuminate an object or a pattern projecting unit to project a pattern on the object.

BRIEF SUMMARY OF THE INVENTION

According to a first aspect of the present invention, there is provided a three-dimensional photographing apparatus comprising:

a photographing unit configured to photograph an object from a plurality of viewpoints; and a projecting unit configured to project a pattern on the object in photographing, the projecting unit including an optical system having a projection view angle, wherein the projection view angle of the optical system is set so as to project the pattern within a range where the photographing unit is able to photograph the object and on an overlapped area which is formed by overlapping photographing spaces capable of photographing the object from the viewpoints.

According to a second aspect of the present invention, there is provided a three-dimensional photographing apparatus comprising:

a photographing unit configured to photograph an object from a plurality of viewpoints; and an illuminating unit configured to illuminate the object in photographing, the illuminating unit including an optical system having an illumination angle, wherein the illumination angle of the optical system is set so as to illuminate an area which is smaller than an overlapped area formed by overlapping photographing spaces capable of photographing the object from the viewpoints and which includes at least the object.

According to a third aspect of the present invention, there is provided a photographing method of a three-dimensional photographing apparatus, comprising:

projecting a pattern on an object; and photographing the object on which the pattern is projected, from a plurality of viewpoints, wherein the projecting the pattern has a projection view angle which is set so as to project the pattern on an overlapped area formed by overlapping photographing spaces capable of photographing the object from the viewpoints.

According to a fourth aspect of the present invention, there is provided a photographing method of a three-dimensional photographing apparatus, comprising:

illuminating an object; and photographing the illuminated object from a plurality of viewpoints, wherein the illuminating the object has an illumination angle which is set so as to illuminate an area which is smaller than an overlapped area formed by overlapping photographing spaces capable of photographing the object from the viewpoints and which includes at least the object.

According to a fifth aspect of the present invention, there is provided a stereo adapter comprising:

an optical path splitting optical system configured to guide images of an object viewed from first and second viewpoints that differ from each other to a photographing optical system of a photographing unit connected to the stereo adapter to acquire a stereo image of the object; and a projecting unit configured to project a pattern on the object in photographing, wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the projecting unit projects the pattern on an area in which all points are distant from the intersection point with respect to the photographing optical system, the area being one of areas delimited by the first boundary line and the second boundary line with the intersection point at a top.

According to a sixth aspect of the present invention, there is provided a stereo adapter comprising:

an optical path splitting optical system configured to guide images of an object viewed from first and second viewpoints that differ from each other to a photographing optical system of a photographing unit connected to the stereo adapter to acquire a stereo image of the object; and an illuminating unit configured to illuminate the object in photographing, wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the illuminating unit illuminates an area in which all points are distant from the intersection point with respect to the photographing optical system, the area being one of areas delimited by the first boundary line and the second boundary line with the intersection point at a top.

According to a seventh aspect of the present invention, there is provided a three-dimensional photographing apparatus comprising:

a photographing unit configured to photograph an object from a first viewpoint and a second viewpoint that is located at a given distance from the first viewpoint, the photographing unit including a photographing optical system; and a projecting configured to project a pattern on the object in photographing, wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the projecting unit projects the pattern on an area in which all points are distant from the intersection point with respect to the photographing optical system, the area being one of areas delimited by the first boundary line and the second boundary line with the intersection point at a top.

According to an eighth aspect of the present invention, there is provided a three-dimensional photographing apparatus comprising:

a photographing unit configured to photograph an object from a first viewpoint and a second viewpoint that is located at a given distance from the first viewpoint, the photographing unit including a photographing optical system; and an illuminating unit configured to illuminate the object in photographing, wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the illuminating unit illuminates an area in which all points are distant from the intersection point with respect to the photographing optical system, the area being one of areas delimited by the first boundary line and the second boundary line with the intersection point at a top.

According to a ninth aspect of the present invention, there is provided a stereo adapter connected to a photographing unit having a photographing optical system for three-dimensional photography, comprising:

an optical path splitting optical system configured to guide images of an object viewed from a plurality of viewpoints to the photographing optical system of the photographing unit connected to the stereo adapter;

at least one of a projecting unit configured to project a pattern on the object in photographing and an illuminating unit configured to illuminate the object in photographing; and an illumination angle designating value changing unit configured to receive illumination angle information for illumination, which corresponds to a photographing view angle of the photographing unit connected to the stereo adapter, from the photographing unit and conform the received illumination angle information to a characteristic of the optical path splitting optical system, thereby to control at least one of a projection view angle of the projecting unit and an illumination angle of the illuminating unit.

According to a tenth aspect of the present invention, there is provided a three-dimensional photographing apparatus comprising:

photographing means for photographing an object from a plurality of viewpoints; and projecting means for projecting a pattern on the object in photographing, the projecting means including an optical system having a projection view angle, wherein the projection view angle of the optical system is set so as to project the pattern within a range where the photographing means is able to photograph the object and on an overlapped area which is formed by overlapping photographing spaces capable of photographing the object from the viewpoints.

According to an eleventh aspect of the present invention, there is provided a three-dimensional photographing apparatus comprising:

photographing means for photographing an object from a plurality of viewpoints; and illuminating means for illuminating the object in photographing, the illuminating means including an optical system having an illumination angle, wherein the illumination angle of the optical system is set so as to illuminate an area which is smaller than an overlapped area formed by overlapping photographing spaces capable of photographing the object from the viewpoints and which includes at least the object.

According to a twelfth aspect of the present invention, there is provided a stereo adapter comprising:

an optical path splitting optical system for guiding images of an object viewed from first and second viewpoints that differ from each other to a photographing optical system of photographing means connected to the stereo adapter to acquire a stereo image of the object; and projecting means for projecting a pattern on the object in photographing, wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the projecting means projects the pattern on an area in which all points are distant from the intersection point with respect to the photographing optical system, the area being one of areas delimited by the first boundary line and the second boundary line with the intersection point at a top.

According to a thirteenth aspect of the present invention, there is provided a stereo adapter comprising:

an optical path splitting optical system for guiding images of an object viewed from first and second viewpoints that differ from each other to a photographing optical system of photographing means connected to the stereo adapter to acquire a stereo image of the object; and illuminating means for illuminating the object in photographing, wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the illuminating means illuminates an area in which all points are distant from the intersection point with respect to the photographing optical system, the area being one of areas delimited by the first boundary line and the second boundary line with the intersection point at a top.

According to a fourteenth aspect of the present invention, there is provided a three-dimensional photographing apparatus comprising:

photographing means for photographing an object from a first viewpoint and a second viewpoint that is located at a given distance from the first viewpoint, the photographing means including a photographing optical system; and projecting means for projecting a pattern on the object in photographing, wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the projecting means projects the pattern on an area in which all points are distant from the intersection point with respect to the photographing optical system, the area being one of areas delimited by the first boundary line and the second boundary line with the intersection point at a top.

According to a fifteenth aspect of the present invention, there is provided a three-dimensional photographing apparatus comprising:

photographing means for photographing an object from a first viewpoint and a second viewpoint that is located at a given distance from the first viewpoint, the photographing means including a photographing optical system; and illuminating means for illuminating the object in photographing, wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the illuminating means illuminates an area in which all points are distant from the intersection point with respect to the photographing optical system, the area being one of areas delimited by the first boundary line and the second boundary line with the intersection point at a top.

According to a sixteenth aspect of the present invention, there is provided a stereo adapter connected to a photographing unit having a photographing optical system for three-dimensional photography, comprising:

an optical path splitting optical system for guiding images of an object viewed from a plurality of viewpoints to the photographing optical system of the photographing unit connected to the stereo adapter;

at least one of projecting means for projecting a pattern on the object in photographing and illuminating means for illuminating the object in photographing; and illumination angle designating value changing means for receiving illumination angle information for illumination, which corresponds to a photographing view angle of the photographing unit connected to the stereo adapter, from the photographing unit and conforming the received illumination angle information to a characteristic of the optical path splitting optical system, thereby to control at least one of a projection view angle of the projecting means and an illumination angle of the illuminating means.

In this specification, the wording "overlapped area" means an area obtained by overlapping photographing spaces where a photographing apparatus photographs an object from at least two viewpoints. In a narrow sense in stereophotographing, it means a view angle area including at least the same photographed part of the same object.

The illumination angle of pattern projection is defined as "projection view angle."

The "distance-measurable" means that a range image can be acquired. The "range image" is an image whose pixels each contain range information to an object, whereas a common luminance image is an image whose pixels each contain luminance information as texture.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 shows a usage condition of a three-dimensional photographing apparatus according to a first embodiment of the present invention;

FIG. 2 is a perspective view of the outward appearance of the three-dimensional photographing apparatus according to the first embodiment of the present invention;

FIG. 3 is a front view of the outward appearance of the three-dimensional photographing apparatus according to the first embodiment of the present invention;

FIG. 4 is an illustration of the configuration of an optical path splitting optical system in a stereo adapter included in the three-dimensional photographing apparatus according to the first embodiment of the present invention;

FIG. 5 is a block diagram specifically showing the configuration of the three-dimensional photographing apparatus according to the first embodiment of the present invention;

FIG. 16 is an illustration of a setting of a projection view angle of a projecting unit or an illumination angle of an illuminating unit in a stereo adapter that configures a three-dimensional photographing apparatus according to a sixth embodiment of the present invention;

FIG. 17 shows a relationship between a commonly-used photographing unit and an external illuminating unit; and FIG. 18 is a block diagram of a stereo adapter that configures a three-dimensional photographing apparatus according to a seventh embodiment of the present invention.

DETAILED DESCRIPTION OF THE INVENTION

Figure 6:
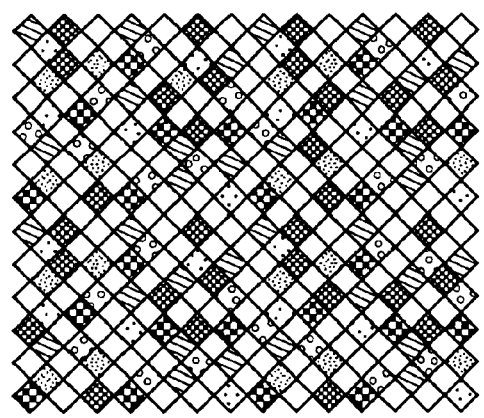
FIG. 6 shows a random dot pattern formed by a projection pattern filter.

Embodiments of the present invention will now be described with reference to the accompanying drawings.

[First Embodiment]

First, an example of projecting a pattern on an overlapped area will be described as a first embodiment of the present invention. Referring to FIGS. 1 to 4, a three-dimensional photographing apparatus 10 according to the first embodiment comprises a photographing unit 12 that photographs an object O having a single photographing optical system and a stereo adapter 14 that is connected to a photographing lens 16 of the photographing unit 12 to photograph the object O from at least two different viewpoints.

The stereo adapter 14 includes a housing 18 containing an optical path splitting optical system 20. An illuminating unit 22, which illuminates the object O in photographing, is provided on the front of the housing 18 or the object side of the housing 18. A projecting unit 24, which projects a pattern on the object O in photographing, is provided on the housing 18.

The optical path splitting optical system 20 guides images of the object O viewed from a plurality of viewpoints to the photographing lens 16 and forms the image on an image pickup device 25 (see FIG. 5) of the photographing unit 12. As shown in FIG. 4, the optical system 20 includes two light-receiving mirrors 26 separated from each other and two deflection mirrors 28 arranged in front of the photographing lens 16. The object images reflected by the light-receiving mirrors 26 enter the photographing lens 16 through the deflection mirrors 28 such that images from two different viewpoints can be formed on the image pickup device 25. Consequently, stereo image data 30 (see FIG. 5) can be acquired from the image pickup device 25.

The photographing unit 12 has the same configuration as that of a well-known digital still camera as illustrated in FIG. 5. It comprises a release button 32, a photographing lens 16, a photographing view angle adjusting unit 34, a photographing aperture adjusting unit 36, a photographing focus adjusting unit 38, a photographing shutter adjusting unit 40, an image pickup device 25, a sensitivity adjusting unit 42, an image processing unit 44, an image storing unit 46, a photometer 47, and an exposure and focus control unit 48.

The stereo image data 30 picked up by the image pickup device 25 of the photographing unit 12 so configured is processed by the image processing unit 44 and stored in the image storing unit 46. The processed stereo image data 30 stored in the unit 46 is sent to a three-dimensional reconfiguring unit 50 through a data transferring unit 49 that includes a removable memory card 49a and a data communicating unit 49b.

The illuminating unit 22, which is provided on the stereo adapter 14, includes an illuminating optical system 52, an illumination angle adjusting unit 54, an illuminating light source 56, and an illuminating light source adjusting unit 58. In the first embodiment, the illuminating light source 56 includes an electronic flashlight serving as a flash source or a so-called strobe and its arbitrary illuminating time can be adjusted by the illuminating light source adjusting unit 58. Thus, the amount of light of the illuminating unit 22 is controlled.

The projecting unit 24 provided on the stereo adapter 14 includes a projecting lens (projection optical system) 60, a projection view angle adjusting unit 62, a projecting aperture adjusting unit 64, a projecting focus adjusting unit 66, a projecting pattern filter 68, a projecting light source 70, and a projecting light source adjusting unit 72. In the first embodiment, the projecting pattern filter 68 employs a dot pattern (random dot pattern) in which color information items are randomly arranged. Like the illuminating light source 56, the projecting light source 70 includes an electronic flashlight serving as a flash source or a so-called strobe and its arbitrary illumination time can be adjusted by the projecting light source adjusting unit 72. Thus, the amount of light of the projecting unit 24 is controlled.

The exposure and focus control unit 48 of the photographing unit 12 controls the illumination angle adjusting unit 54 and illuminating light source adjusting unit 58 of the illuminating unit 22 and the projection view angle adjusting unit 62, projecting aperture adjusting unit 64, projecting focus adjusting unit 66, and projecting light source adjusting unit 72 of the projecting unit 24.

An operation of the three-dimensional photographing apparatus 10 having the above configuration will now be described. When a user depresses the release button 32 of the photographing unit 12, the exposure and focus control unit 48 reads luminance information from the photometer 47. Based on the luminance information, the exposure and focus control unit 48 causes the photographing shutter adjusting unit 40 to set the shutter speed at such a value that an object O is photographed darkly unless the object is illuminated by the illuminating unit 22 and a pattern is projected by the projecting unit 24. With this setting, the object O is underexposed only by ambient light.

The exposure and focus control unit 48 causes the illuminating unit 22 to emit light in advance and then reads luminance information from the photometer 47. Based on the luminance information, the exposure and focus control unit 48 narrows the aperture of the projecting unit 24 as much as possible such that the object O is approximately exposed by the amount of light emitted from the projecting light source 70 under the control of the projecting light source adjusting unit 72, and transmits the narrowed aperture to the projecting aperture adjusting unit 64 of the projecting unit 24. Thus, the object O can be photographed by a smaller amount of exposure to ambient light than that of exposure to a flashlight.

Figure 7:
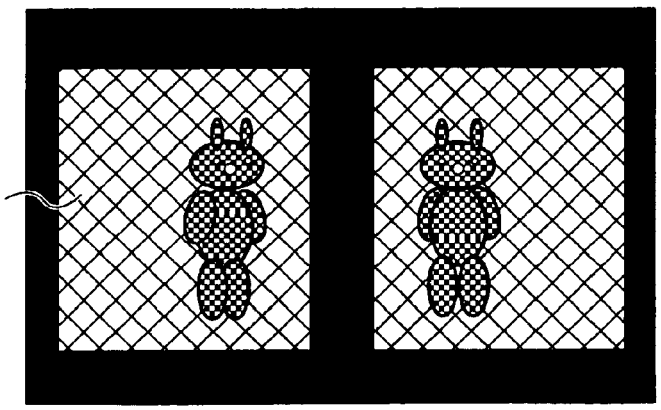
FIG. 7 shows stereo pattern projection image data.

After that, the photographing unit 12 performs the first photography. In synchronization with the first photography, the exposure and focus control unit 48 controls the projecting light source adjusting unit 72 of the projecting unit 24 to emit light from the projecting light source 70 and illuminate the projecting pattern filter 68 with the light. Thus, an image of the projecting pattern filter 68 is formed on the object O through the projecting lens 60. Consequently, in the first photography, a stereo image of the object O whose pattern is projected is formed on the image pickup device 25 through the stereo adapter 14 and photographing lens 16. The formed stereo image data 30 is processed by the image processing unit 44 and stored in the image storing unit 46 as stereo pattern projection image data 74 as shown in FIG. 7.

Then, based on the luminance information acquired from the photometer 47 when the illuminating unit 22 emits light in advance, the exposure and focus control unit 48 sets a proper amount of light emitted from the illuminating unit 22 and instructs the illuminating light source adjusting unit 58 on the amount of emitted light. Thus, the object O can be photographed with a proper amount of light emitted from the illuminating unit 22.

Figure 8:
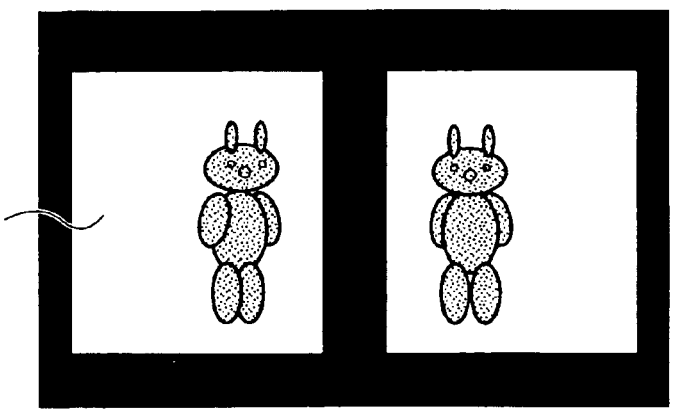
FIG. 8 shows stereo texture illumination image data.

The photographing unit 12 performs the second photography. In synchronization with the second photography, the exposure and focus control unit 48 controls the illuminating light source adjusting unit 58 of the illuminating unit 22 to cause the illuminating light source 56 to emit light. In the second photography, therefore, a stereo image of the object O that is texture-illuminated is photographed. The stereo image data 30 of the photographed stereo image is processed by the image processing unit 44 and stored in the image storing unit 46 as stereo texture illumination image data 76 as shown in FIG. 8.

The stereo pattern projection image data 74 and stereo texture illumination image data 76 stored in the image storing unit 46 are sent to the three-dimensional reconfiguring unit 50 through the data transferring unit 49.

The unit 50 searches the stereo pattern projection image data 74 for corresponding points between right and left images to compute a displacement of the corresponding points or a parallax that is uniquely determined by both the texture and random dot pattern of the projecting pattern filter 68. The unit also computes a range on the principle of triangulation to generate a range image of the object O. Then, a three-dimensional image is formed of the range image and its corresponding stereo texture illumination image data 76 and output from an output unit (not shown) such as a display.

The above operation is the same as that of a conventional three-dimensional photographing apparatus.

Figure 9:
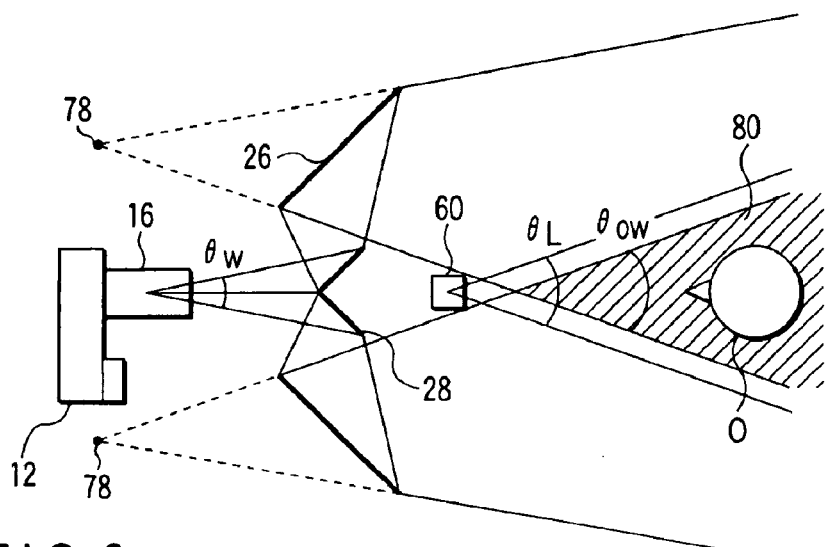
FIG. 9 is an illustration of an overlapped area.

The first embodiment is featured in that the projection view angle of a pattern projected by the projecting unit 24 and the illumination angle of light emitted from the illuminating unit 22 are both set in advance as follows. More specifically, when an object is photographed from a plurality of viewpoints 78, the spaces capable of photographing the object from the viewpoints 78, or the angles of view have an overlapped area 80 as shown in FIG. 9. This overlapped area 80 serves to reconfigure a three-dimensional image in the three-dimensional reconfiguring unit 50. In the first embodiment, the projection view angle $\theta_L$ of the projecting unit 24 is set in such a manner that a pattern is projected on the overlapped area 80. The illumination angle of the illuminating unit 22 is set in the same manner.

Figure 10:
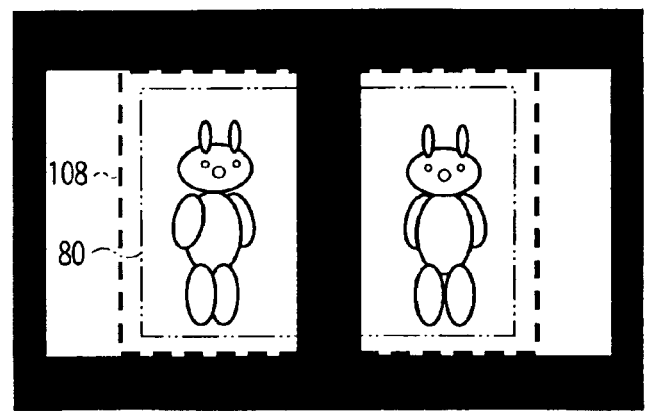
FIG. 10 shows a relationship between an overlapped area and a projection/illuminated area.

Since the projection view angle and illumination angle are adjusted as described above, the overlapped area 80 shown in FIG. 10 has only to be illuminated and a pattern has only to be projected on the area 80. It is thus possible to concentrate a small amount of light on a narrow area. Even though the output of the illuminating light source 56 and projecting light source 70 is low, an adequate amount of light can be obtained as compared with an apparatus having a view angle corresponding to the photographing unit 12 itself. This contributes to downsizing of the three-dimensional photographing apparatus 10 and saving of energy.

The first embodiment has the following unique advantages. Since the capacity of a capacitor used for a flashlight is generally increased due to energy saving, the apparatus improves in sequence-exposure performance, and a photographing interval between stereo texture illumination images and between stereo pattern projection images is shortened. Accordingly, the follow-up to a moving object is improved and the influence of a camera shake is reduced. Since, moreover, the projecting unit 24 can be provided in a space between the light-receiving mirrors 26 of the stereo adapter 14, occlusion between different viewpoints of the random dot pattern can be prevented. The allowable range of the three-dimensional reconfiguration is maximized and the photographing apparatus can favorably be configured.

The respective units of the first embodiment can be modified and varied. For example, images are picked up from a plurality of viewpoints using the stereo adapter 14; however, it can be done by a plurality of cameras.

The light-receiving view angle of the photometer 47 can be set in-accordance with the pattern projection range and, in this case, various exposure parameters can be set more accurately. For example, the aperture and the amount of light of the projecting unit 24 and illuminating unit 22, which are set when the illuminating unit 22 emits light in advance, can be determined by range information of the photographing focus adjusting unit 38 of the photographing unit 12 and the amount of light emitted from each of the light sources 70 and 56. In this case, a light-emission amount correcting unit (not shown) is provided to correct an amount of light emission in accordance with the projection view angle and illumination angle and thus correct a variation in the amount of light for projection and illumination due to a variation in the view angle. In other words, the amount of light emission, which is a reference amount depending upon the range information, increases when the view angle is widened and it decreases when the view angle is narrowed. A user can instruct the light source adjusting units 72 and 58 about the amount of light emission using an external automatic dimmer having a so-called direct photometer and a separate dimmer sensor for sensing the brightness of an image to be picked up.

[Second Embodiment]

A second embodiment of the present invention will now be described. The second embodiment is directed to a case where a pattern is projected on an area including an object O and the area is illuminated.

Figure 11:
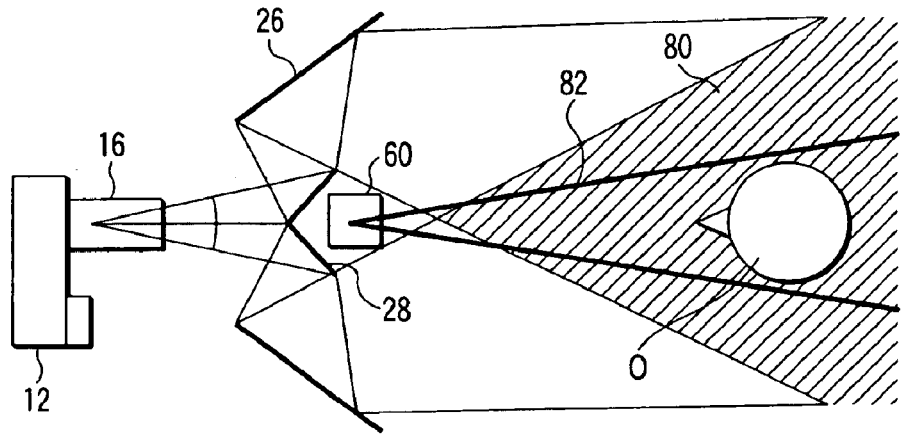
FIG. 11 is an illustration of an overlapped area and a projection view angle in a three-dimensional photographing apparatus according to a second embodiment of the present invention.

More specifically, when an object O to be photographed is predetermined, a pattern is projected on an area (projection area 82) which includes the object O and which is smaller than an overlapped area 80, and the area is illuminated, as illustrated in FIG. 11. For example, the size of the object O is determined according to the specifications of the photographing unit 12 in such a manner that the object O falls within the overlapped area 80 and a range with little influence of lens distortion.

The second embodiment produces energy saving and thus has the same advantages as those of the first embodiment.

[Third Embodiment]

A third embodiment of the present invention will now be described. The third embodiment is directed to a case where a pattern is projected on an overlapped area within a distance-measurable range. The "distance-measurable" means that a range can be measured by stereophotographing or photographing from a plurality of viewpoints.

Figure 12:
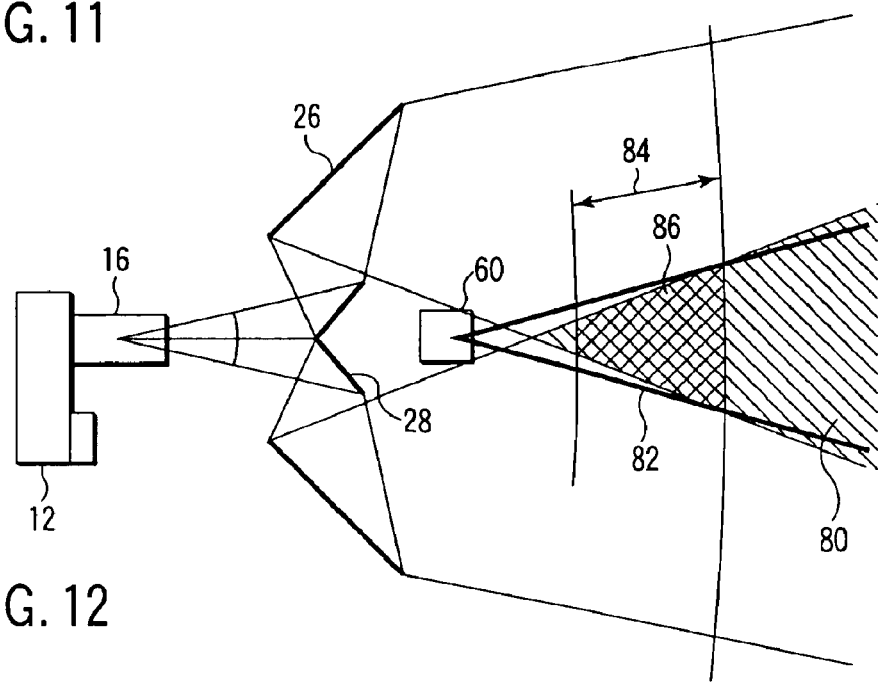
FIG. 12 is an illustration of an overlapped area and a projection view angle in a three-dimensional photographing apparatus according to a third embodiment of the present invention.

More specifically, a pattern is projected on an area 86 and the area 86 is illuminated as shown in FIG. 12. The area 86 corresponds to a range 84 measured by the above three-dimensional reconfiguring unit 50. The range 84 is included in an overlapped area 80 that is formed by overlapping spaces capable of photographing from a plurality of viewpoints.

The long-distance limit of the range 84 depends upon the image distance resolution of the photographing unit 12 or three-dimensional reconfiguring unit 50, and the short-distance limit thereof depends upon the range within which the unit 50 searches an image for corresponding points. The distance resolution generally depends upon how precisely an amount of parallax between corresponding points of a plurality of viewpoint images can be detected. In the long distance with a smaller amount of parallax, the amount of parallax is below the image resolution to make it impossible to determine a difference in distance. This is the long-distance limit of the distance-measurable range. Actually, there may be a case where the short-distance limit is defined as the limit of the distance-measurable range if it is taken into consideration that the shape of an object is photographed with given precision.

In the search for corresponding points between a plurality of images, generally, the processing time is shortened by searching pixels on an epipolar line for corresponding points. Though the range of search for the corresponding points can be restricted further for higher-speed processing, the amount of parallax between the images increases with increasing proximity to an object. The restriction of the search range therefore restricts the amount of parallax between the images and, in other words, it restricts the short-distance limit of the measurable range.

As described above, the long-distance and short-distance limits of the measurable range are determined by both the photographing unit 12 and three-dimensional reconfiguring unit 50. Actually, there is an object whose surface cannot be range-measured because of occlusion between a plurality of viewpoints. In the third embodiment, however, the surface is included in the measurable range as an occlusion area.

The third embodiment described above produces energy saving and thus has the same advantages as those of the first embodiment.

[Fourth Embodiment]

A fourth embodiment of the present invention will now be described. In the fourth embodiment, the projection view angle of a pattern and the illumination angle vary with an overlapped area. There are two cases: one (first case) is that only the photographing view angle is directly related to the variations in the projection view angle and illumination angle, and the other (second case) is that a factor as well as the photographing view angle is related thereto.

Figure 13A:
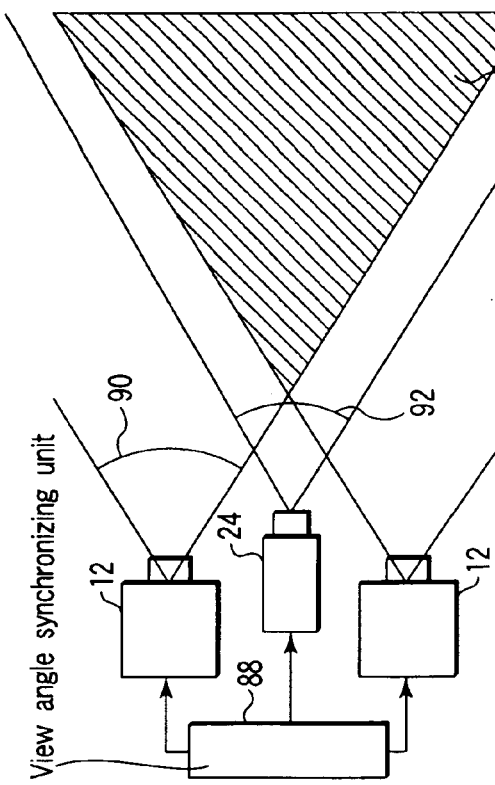
FIG. 13A shows an overlapped area and a projection view angle at a telephoto end of a three-dimensional photographing apparatus according to a fourth embodiment of the present invention, in which a stereo vision is achieved by a plurality of photographing units whose relative positions are known.
Figure 13B:
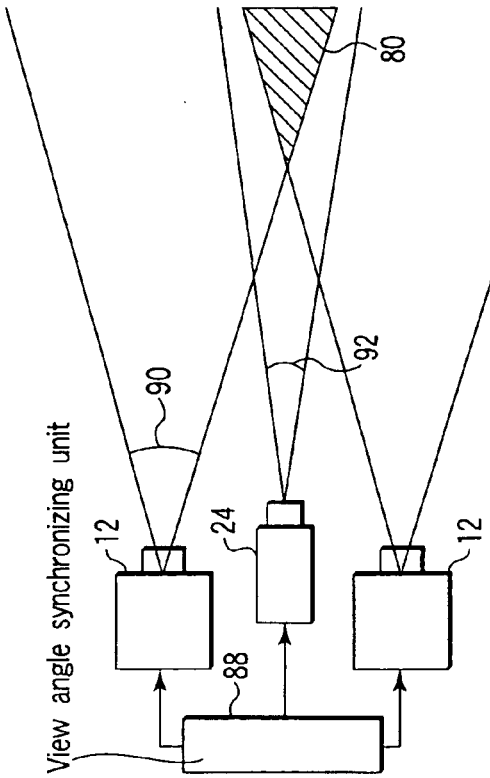
FIG. 13B shows an overlapped area and a projection view angle at a wide-angle end of the three-dimensional photographing apparatus according to the fourth embodiment of the present invention.

First, the first case will be described. In the first embodiment, the stereo adapter 14 picks up images from a plurality of viewpoints. However, as shown in FIGS. 13A and 13B, a stereo vision can be achieved by a plurality of photographing units 12 whose relative positions are known. In this case, the photographing units 12 each have a zoom lens as a photographing lens 16, and a view angle synchronizing unit 88 is provided to synchronize the photographing view angles 90 of the lenses 16 of the units 12. FIG. 13A shows an overlapped area 80 and a projection view angle 92 at a telephoto end, and FIG. 13B shows them at a wide-angle end.

The view angle synchronizing unit 88 can be configured to instruct the projection view angle adjusting unit 62 of the projecting unit 24 and the illumination angle adjusting unit 54 of the illuminating unit 22 to adjust the projection view angle and the illumination angle in accordance with the size of the overlapped area 80 which varies with a change in the view angle of the photographing lenses 16. In this case, the projection view angle and illumination angle can be adjusted by obtaining their adjustment values with reference to a table showing a relationship between the photographing view angle and projection view angle and a table showing a relationship between the photographing view angle and illumination angle. They can also be adjusted using an overlapped-area detecting unit (not shown) to detect an overlapped area 80 that has varied with a change in the photographing view angle and then compute the projection view angle and illumination angle in accordance with the results of the detection.

The above configuration to give an instruction to the projection view angle adjusting unit 62 and the illumination angle adjusting unit 54 by the view angle synchronizing unit 88 or overlapped-area detecting can be adopted in the foregoing stereo adapter 14.

The view angle synchronizing unit 88 can be mechanically or electrically associated with the rotation of a zoom ring of one of the photographing lenses 16 to adjust the zooming of the other photographing lens 16, the projection view angle of the projecting unit 24 and the illumination angle of the illuminating unit 22.

Figure 14:
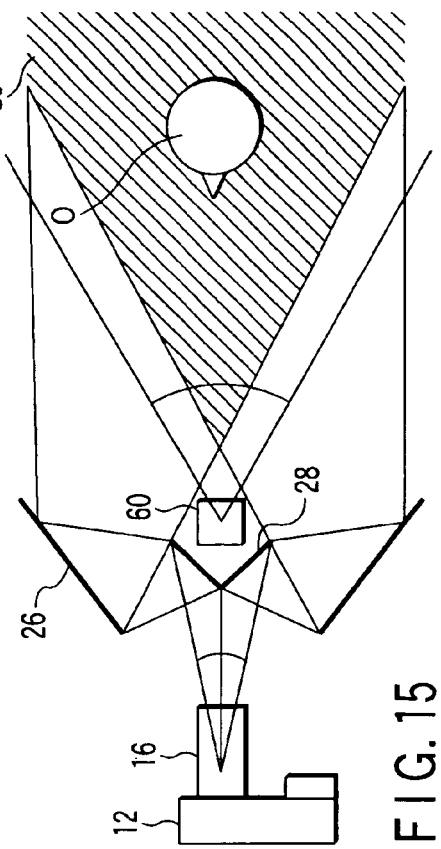
FIG. 14 shows an overlapped area and a projection view angle at a telephoto end of the three-dimensional photographing apparatus according to the fourth embodiment of the present invention, which uses a stereo adapter.
Figure 15:
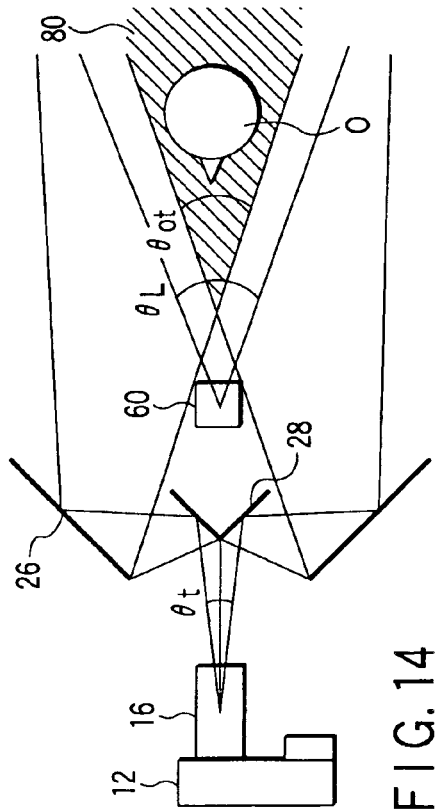
FIG. 15 shows an overlapped area and a projection view angle when light-receiving mirrors and deflection mirrors are varied in congestion angle.

Then, the second case will be described. In the three-dimensional photographing apparatus 10 using a stereo adapter 14, when the photographing lenses 16 are adjusted to have a wide-angle end view angle $\theta_w$, the overlap view angle $\theta_{ow}$ of a stereo image is obtained as shown in FIG. 9 and then the overlapped area 80 serves as one for three-dimensional reconfiguration. When the photographing lenses 16 are adjusted to have a telephoto end view angle $\theta_t$, the overlap view angle $\theta_{ot}$ of a stereo image is obtained as shown in FIG. 14 and then the overlapped area 80 serves as one for three-dimensional reconfiguration. The projection lens 60 of the projecting unit 24 has a projection view angle $\downarrow_L$ and includes a zoom lens, a varifocal lens and a focal length selecting lens each having the following view angle adjusting range:

$$\theta_{ot} + \alpha < \theta_L < \theta_{ow} + \beta\alpha, \; \beta << \theta$$

where $\alpha$ and $\beta$ each indicate a preliminary angle for absorbing an individual difference of the lens and the like. In FIGS. 9 and 14, the angle of the light-receiving mirrors 26 is fixed and so is the angle of the deflection mirrors 28. The telephoto end view angle $\theta_t$ therefore almost coincides with the wide-angle end view angle $\theta_w$. As shown in FIG. 15, however, the angle varies when the overlapped area 80 is controlled by varying the congestion angles of the light-receiving mirrors 26 and deflection mirrors 28.

In the fourth embodiment, the projection view angle adjusting unit 62 of the projecting unit 24 adjusts the view angle of the projecting lens 60 so as to include the overlap view angle $\theta_o$ that is computed by the exposure and focus control unit 48 based on the information of the photographing view angle adjusting unit 34 of the photographing unit 12. In this case, the unit 48 can easily compute the overlap view angle with reference to a table showing a correspondence between the view angle of the photographing unit 12, the relative positions of a plurality of viewpoints, the congestion angles of lines of sight from the viewpoints, and the overlapped area 80.

Similarly, the illumination angle adjusting unit 54 of the illuminating unit 22 adjusts the illumination angle of the illuminating optical system 52 so as to include the overlap view angle $\theta_o$ that is computed by the exposure and focus control unit 48.

[Fifth Embodiment]

A fifth embodiment of the present invention will now be described. The fifth embodiment is directed to a case where an amount of light emission varies with the adjustment and change of the projection view angle and illumination angle as in the fourth embodiment.

More specifically, the projection view angle and illumination angle are adjusted by varying a focal point using a zoom lens, a varifocal lens or a focal length selecting lens. An amount of light emitted from the projecting light source 70 of the projecting unit 24 is corrected in accordance with the adjusted projection view angle, and an amount of light emitted from the illuminating light source 56 of the illuminating unit 22 is corrected in accordance with the adjusted illumination angle.

According to the subject matter of the present invention, a user adopts a light source having an output enough to illuminate or project a pattern on the largest one of overlapped areas that vary with an assumed change in the view angle or congestion angle of the photographing unit. Under such design conditions, the largest overlapped area tends to be narrowed more than the photographing space of the photographing unit itself. If, therefore, the output of the light source is set as described above, the user can adopt an apparatus whose output is lower than that of the light source to cover the entire photographing view angle of the photographing unit. The apparatus can thus be downsized more than an apparatus with a light source that is commonly used for a photographing projecting (illuminating) unit. Moreover, even though an overlapped area that is narrower than the above-described largest one is set by adjusting the photographing view angle or congestion angle of the photographing unit, light is not emitted to the narrow overlapped area more than required since the amount of light emitted from the light source of the projecting (illuminating) light source adjusting unit is corrected. Thus, the apparatus can be downsized and unnecessary energy consumption can be prevented, which contributes to energy saving.

[Sixth Embodiment]

A sixth embodiment of the present invention will now be described. The sixth embodiment is directed to an example of a stereo adapter 14 which is configured separately from a photographing unit 12 and used as a three-dimensional photographing apparatus 10 when it is connected to the unit 12. In this case, a pattern projection view angle or an illumination angle is set in the stereo adapter 14. In other words, when the adapter 14 has an optical path splitting optical system 20 that guides object images viewed from a plurality of viewpoints to a single photographing optical system. The image to be photographed is thus formed as shown in FIGS. 7 and 8.

In the sixth embodiment, as shown in FIG. 16, the stereo adapter 14 includes an optical path splitting optical system 20 and a projecting unit 24 or an illuminating unit 22 (FIG. 16 shows only the projecting unit 24, but the adapter 14 can include only the illuminating unit 22 or both the units 22 and 24). The optical path splitting optical system 20 guides images of an object, which are viewed from first and second viewpoints 78a and 78b that differ from each other to acquire a stereo image of the object, to one photographing lens 16 of the photographing unit 12 connected to the adapter 14. The projecting unit 24 projects a pattern on the object, and the illuminating unit 22 illuminates the object. Of two boundary lines 94-1 and 94-2 that delimit a field of view from the first viewpoint 78a, the boundary line (94-1 in FIG. 16) that is closer to the second viewpoint 78b is defined as a first boundary line 94. Of two boundary lines 96-1 and 96-2 that delimit a field of view from the second viewpoint 78b, the boundary line (96-2 in FIG. 16) that is closer to the first viewpoint 78a is defined as a second boundary line 96. The first and second boundary lines 94 and 96 intersect at an intersection point P shown by a reference numeral 98. A pattern is projected on an area 100 in which all points are distant from the intersection point P with respect to the photographing optical system of the photographing unit 12, or the area 100 is illuminated, the area 100 being one of areas delimited by the first and second boundary lines 94 and 96 with the intersection point P at the top.

When the light-receiving mirrors 26 and deflection mirrors 28 are fixed, the area 100 does not vary irrespective of the photographing view angle of the photographing lens 16. Hence, when the stereo adapter 14 is connected to the photographing unit 12 for stereophotographing, the overlapped area of the photographing unit 12 becomes almost equal to the area 100 irrespective of the photographing view angle.

The same is true of photographing using a plurality of cameras, which are arranged at regular intervals, in place of the stereo adapter 14. In this case, the above first and second viewpoints 78a and 78b correspond to the positions of the cameras.

[Seventh Embodiment]

A seventh embodiment of the present invention will now be described. The seventh embodiment is directed to another example of the stereo adapter 14 which is configured separately from the photographing unit 12 and used as the three-dimensional photographing apparatus 10 when it is connected to the unit 12.

The photographing unit 12 generally includes an external illumination connecting unit 104 so as to use an external illuminating unit 102, as shown in FIG. 17. The external illumination connecting unit 104 is configured so as to transmit sync signals and exposure information as well as illumination angle information, which is set by the photographing view angle adjusting unit 34 and conformed to the view angle of the photographing lens 16, to the external illuminating unit 102.

The stereo adapter 14 according to the seventh embodiment is connected to the photographing unit 12 including the external illumination connecting unit 104. In order to serve as the three-dimensional photographing apparatus 10, the stereo adapter 14 further includes an illumination angle designating value changing unit 106, as illustrated in FIG. 18.

An operation of the seventh embodiment will now be described. In normal photography, the stereo adapter 14 is not connected to the photographing unit 12, but the external illumination connecting unit 104 is used to transmit illumination angle information, sync signals, exposure information, etc. to the external illuminating unit 102 such as a so-called external strobe and a so-called external flashlight. If the stereo adapter 14 is used in place of the external illuminating unit, the illumination angle designating value changing unit 106 of the stereo adapter 14 is connected to the external illumination connecting unit 104 of the photographing unit 12.

The illumination angle designating value changing unit 106 converts a designated value of a projection view angle into such an angle as to produce the same advantages as those of the fourth embodiment, referring to a relationship between the overlapped view angle in the fourth embodiment and the projection view angle, and inputs the angle to the projection view angle adjusting unit 62 of the projecting unit 24. Then, the unit 106 is synchronized with the above-described first photography in response to a sync signal from the external illumination connecting unit 104 of the photographing unit 12 to project a pattern at an appropriate view angle in accordance with the input value. Similarly, the illumination angle designating value changing unit 106 converts illumination angle information and inputs a value designated by the converted illumination angle information to the illumination angle adjusting unit 54 of the illuminating unit 22. Then, the unit 106 is synchronized with the above second photography in response to a sync signal from the external illumination connecting unit 104 of the photographing unit 12 to perform illumination at an appropriate view angle corresponding to the input value. Using the function of the external illumination connecting unit 104 that is provided in advance for the photographing unit 12, a pattern can easily be projected on the overlapped area of the stereo adapter 14 and the overlapped area can easily be illuminated. Consequently, the three-dimensional photographing apparatus 10 can be configured without making a great change to the photographing unit 12.

In other words, according to the seventh embodiment, a photographing space is changed when the stereo adapter 14 is connected, but energy saving can be achieved if the projection view angle and illumination angle of a pattern are set to an appropriate area. Moreover, the projection view angle and illumination angle of the pattern can be adjusted without making a great change to the photographing unit 12.

The present invention has been described according to the respective embodiments. However, it is not limited to the embodiments but can be subjected to various modifications and applications within the scope of the subject matter of the present invention.

In the present invention, there is a case where the illumination angle of an optical system of the illuminating unit or projecting unit cannot be set such that only the specific area is illuminated or a pattern is projected on the area. To set and adjust the illumination angle or projection angle so as to include a projection/illumination area 108 (see FIG. 10) having a slight difference in view angle and a displacement of areas does not depart from the essence of the present invention. Idealistically, the area 108 includes the overlapped area 80 shown in FIG. 9, the area 82 that is equal to or larger than a given object and smaller than the overlapped area shown in FIG. 11, and the area 86 within the distance-measurable range and the overlapped area shown in FIG. 12.

A flash-based projecting unit is used in the above embodiments. However, a liquid crystal projector can be used as the projecting unit.

The present invention has been described taking a digital still camera as an example of a photographing apparatus. However, a video camera and a film-based camera can be used as the photographing apparatus.

Additional advantages and modifications will readily occur to those skilled in the art. Therefore, the invention in its broader aspects is not limited to the specific details and representative devices, and illustrated examples shown and described herein. Accordingly, various modifications may be made without departing from the spirit or scope of the general inventive concept as defined by the appended claims and their equivalents.

What is claimed is:

1. A three-dimensional photographing apparatus comprising:
   a photographing unit configured to photograph an object from a plurality of viewpoints; and
   a projecting unit configured to project a pattern on the object in photographing, the projecting unit including an optical system having a projection view angle and a projection view angle adjusting unit configured to set or adjust the projection view angle,
   wherein the projection view angle of the optical system is set or adjusted by the projection view angle adjusting unit in accordance with an overlapped area which is formed by overlapping photographing spaces capable of photographing the object from the viewpoints, so as to project the pattern within a range where the photographing unit is able to photograph the object and on the overlapped area.

2. The apparatus according to claim 1, wherein the projection view angle is set so as to project the pattern on an area which is smaller than the overlapped area and which includes at least the object.

3. The apparatus according to claim 1, wherein the apparatus further comprises a three-dimensional reconfiguring unit configured to three-dimensionally reconfigure images of the object using an image picked up by the photographing unit, and the photographing view angle falls within a range which is measured by the three-dimensional reconfiguring unit and is set so as to project the pattern in an area which is included in the overlapped area.

4. The apparatus according to claim 1, wherein the photographing unit includes:
   a camera having a photographing optical system; and
   a stereo adapter configured to guide images viewed from the viewpoints to the photographing optical system.

5. The apparatus according to claim 1, wherein the projection view angle adjusting unit adjusts a focal length of the optical system of the projecting unit and thus adjusts the projection view angle, and
   the projecting unit further includes:
   a light source configured to emit light to project the pattern, and
   a projecting light source adjusting unit configured to correct an amount of light emitted from the light source, in accordance with the projection view angle adjusted by the projection view angle adjusting unit.

6. The apparatus according to claim 1, wherein a table showing a correspondence between a view angle of the photographing unit, relative positions of the viewpoints of the photographing unit, congestion angles of lines of sight from the viewpoints of the photographing unit, and the overlapped area is stored, and the projection view angle adjusting unit adjusts the projection view angle with reference to the stored table.

7. The apparatus according to claim 1, further comprising an illumination unit configured to illuminate the object in photographing, the illuminating unit including an optical system having an illumination angle, wherein the projection view angle and the illumination angle of the optical system are set so as to project the pattern on an area which is smaller than the overlapped area and which includes at least the object, and the area is illuminated.

8. The apparatus according to claim 7, wherein the illuminating unit includes illumination angle adjusting unit configured to adjust the illumination angle in accordance with the overlapped area.

9. The apparatus according to claim 8, wherein the illumination angle adjusting unit adjusts a focal length of the optical system of the illuminating unit and thus adjusts the illumination angle, and the illuminating unit further comprises;

a light source configured to emit light to illuminate the object, and an illuminating light source adjusting unit configured to correct an amount of light emitted from the light source, in accordance with the illumination angle adjusted by the illumination angle adjusting unit.

10. The apparatus according to claim 8, wherein a table showing a correspondence between a view angle of the photographing unit, relative positions of the viewpoints of the photographing unit, congestion angles of lines of sight from the viewpoints, is stored, and the illumination angle adjusting unit adjusts the illumination angle with reference to the stored table.

11. A three-dimensional photographing apparatus comprising:

a photographing unit configured to photograph an object from a plurality of viewpoints; and an illuminating unit configured to illuminate the object in photographing, the illuminating unit including an optical system having an illumination angle and an illumination angle adjusting unit configured to set or adjust the illumination angle, wherein the illumination angle of the optical system is set or adjusted by the illumination angle adjusting unit in accordance with an overlapped area formed by overlapping photographing spaces capable of photographing the object from the viewpoints, so as to illuminate the overlapped area.

12. A photographing method of a three-dimensional photographing apparatus, comprising:

projecting a pattern on an object; and photographing the object on which the pattern is projected, from a plurality of viewpoints, wherein the projecting the pattern has a projection view angle which is set or adjusted in accordance with an overlapped area formed by overlapping photographing spaces capable of photographing the object from the viewpoints, so as to project the pattern on the overlapped area.

13. A photographing method of a three-dimensional photographing apparatus, comprising:

illuminating an object; and photographing the illuminated object from a plurality of viewpoints, wherein the illuminating the object has an illumination angle which is set or adjusted in accordance with an overlapped area formed by overlapping photographing spaces capable of photographing the object from the viewpoints, so as to illuminate the overlapped area.

14. A stereo adapter comprising:

an optical path splitting optical system configured to guide images of an object viewed from first and second viewpoints that differ from each other to a photographing optical system of a photographing unit connected to the stereo adapter to acquire a stereo image of the object; and a projecting unit configured to project a pattern on the object in photographing, the projecting unit including an optical system having a projection view angle and a projection view angle adjusting unit configured to set or adjust the projection view angle;

wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the projecting unit projects the pattern at the projection view angle set or adjusted by the projection view angle adjusting unit in accordance with an area in which all points are distant from the intersection point with respect to the photographing optical system, the area being one of areas delimited by the first boundary line and the second boundary line with the intersection point at a top.

15. A stereo adapter comprising:

an optical path splitting optical system configured to guide images of an object viewed from first and second viewpoints that differ from each other to a photographing optical system of a photographing unit connected to the stereo adapter to acquire a stereo image of the object; and an illuminating unit configured to illuminate the object in photographing, the illuminating unit including an optical system having an illumination angle and an illumination angle adjusting unit configured to set or adjust the illumination angle;

wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the illuminating unit illuminates the object at the illumination angle set or adjusted by the illumination angle adjusting unit in accordance with an area in which all points are distant from the intersection point with respect to the photographing optical system, the area being one of areas delimited by the first boundary line and the second boundary line with the intersection point at a top.

16. A three-dimensional photographing apparatus comprising:

a photographing unit configured to photograph an object from a first viewpoint and a second viewpoint that is located at a given distance from the first viewpoint, the photographing unit including a photographing optical system; and a projecting unit configured to project a pattern on the object in photographing, the projecting unit including an optical system having a projection view angle and a projection view angle adjusting unit configured to set or adjust the projection view angle;

wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the projecting unit projects the pattern at the projection view angle set or adjusted by the projection view angle adjusting unit, in accordance with an area in which all points are distant from the intersection point with respect to the photographing optical system, the area being one of areas delimited by the first boundary line and the second boundary line with the intersection point at a top.

17. A three-dimensional photographing apparatus comprising:

a photographing unit configured to photograph an object from a first viewpoint and a second viewpoint that is located at a given distance from the first viewpoint, the photographing unit including a photographing optical system; and an illuminating unit configured to illuminate the object in photographing, the illuminating unit including an optical system having an illumination angle and an illumination angle adjusting unit configured to set or adjust the illumination angle;

wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as the second boundary line, and the first boundary line and the second boundary line intersect at an intersection point, the illuminating unit illuminates the object at the illumination angle set or adjusted by the illumination angle adjusting unit, in accordance with an area in which all points are distant from the intersection point with respect to the photographing optical system, the area being one of areas delimited by the first boundary line and the second boundary line with the intersection point at a top.

18. A stereo adapter connected to a photographing unit having a photographing optical system for three-dimensional photography, comprising:

an optical path splitting optical system configured to guide images of an object viewed from a plurality of viewpoints to the photographing optical system of the photographing unit connected to the stereo adapter;

at least one of a projecting unit configured to project a pattern on the object in photographing and an illumination unit configured to illuminate the object in photographing; and an illumination angle designating value changing unit configured to receive illumination angle information for illumination, which corresponds to a photographing view angle of the photographing unit connected to the stereo adapter, from the photographing unit and conform the received illumination angle information to a characteristic of the optical path splitting optical system, thereby to control at least one of a projection view angle of the projecting unit and an illumination angle of the illuminating unit.

19. A three-dimensional photographing apparatus comprising:

photographing means for photographing an object from a plurality of viewpoints; and projecting means for projecting a pattern on the object in photographing, the projecting means including an optical system having a projection view angle and projection view angle adjusting means for setting or adjusting the projection view angle, wherein the projection view angle of the optical system is set or adjusted by the projection view angle adjusting means in accordance with an overlapped area which is formed by overlapping photographing spaces capable of photographing the object from the viewpoints, so as to project the pattern within a range where the photographing means is able to photograph the object and on the overlapped area.

20. A three-dimensional photographing apparatus comprising:

photographing means for photographing an object from a plurality of viewpoints; and illuminating means for illuminating the object in photographing, the illuminating means including an optical system having an illumination angle and illumination angle adjusting means for setting or adjusting the illumination angle, wherein the illumination angle of the optical system is set or adjusted by the illumination angle adjusting means in accordance with an overlapped area formed by overlapping photographing spaces capable of photographing the object from the viewpoints and which includes at least the object, so as to illuminate the overlapped area.

21. A stereo adapter comprising:

an optical path splitting optical system for guiding images of an object viewed from first and second viewpoints that differ from each other to a photographing optical system of photographing means connected to the stereo adapter to acquire a stereo image of the object; and projecting means for projecting a pattern on the object in photographing, the projecting means including an optical system having a projection view angle and projection view angle adjusting means for setting or adjusting the projection view angle;

wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the projecting means projects the pattern at the projection view angle set or adjusted by the projection view angle adjusting means, in accordance with an area in which all points are distant from the intersection point with respect to the photographing optical system, the area being one of areas delimited by the first boundary line and the second boundary line with the intersection point at a top.

22. A stereo adapter comprising:

an optical path splitting optical system for guiding images of an object viewed from first and second viewpoints that differ from each other to a photographing optical system of photographing means connected to the stereo adapter to acquire a stereo image of the object; and illuminating means for illuminating the object in photographing, the illuminating means including an optical system having an illumination angle and illumination angle adjusting means for setting or adjusting the illumination angle;

wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the illuminating means illuminates the object at the illumination angle set or adjusted by the illumination angle adjusting means, in accordance with an area in which all points are distant from the intersection point with respect to the photographing optical system, the area being one of areas delimited by the first boundary line and the second boundary line with the intersection point at a top.

23. A three-dimensional photographing apparatus comprising:

photographing means for photographing an object from a first viewpoint and a second viewpoint that is located at a given distance from the first viewpoint, the photographing means including a photographing optical system; and projecting means for projecting a pattern on the object in photographing, the projecting means including an optical system having a projection view angle and projection view angle adjusting means for setting or adjusting the projection view angle;

wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the projecting means projects the pattern at the projection view angle set or adjusted by the projection view angle adjusting means, in accordance with an area in which all points are distant from the intersection point with respect to the photographing optical system, the area being one of areas delimited by the first boundary line and the second boundary line with the intersection point at a top.

24. A three-dimensional photographing apparatus comprising:

photographing means for photographing an object from a first viewpoint and a second viewpoint that is located at a given distance from the first viewpoint, the photographing means including a photographing optical system; and illuminating means for illuminating the object in photographing, the illuminating means including an optical system having an illumination angle and illumination angle adjusting means for setting or adjusting the illumination angle;

wherein when one of two boundary lines delimiting a field of view from the first viewpoint which is closer to the second viewpoint is defined as a first boundary line, one of two boundary lines delimiting a field of view from the second viewpoint which is closer to the first viewpoint is defined as a second boundary line, and the first boundary line and the second boundary line intersect at an intersection point, the illuminating means illuminates the object at the illumination angle set or adjusted by the illumination angle adjusting means in accordance with an area in which all points are distant from the intersection point with respect to the photographing optical system, the area being one of areas delimited by the first boundary line and the second boundary line with the intersection point at a top.

25. A stereo adapter connected to a photographing unit having a photographing optical system for three-dimensional photography, comprising:

an optical path splitting optical system for guiding images of an object viewed from a plurality of viewpoints to the photographing optical system of the photographing unit connected to the stereo adapter;

at least one of projecting means for projecting a pattern on the object in photographing and illuminating means for illuminating the object in photographing; and illumination angle designating value changing means for receiving illumination angle information for illumination, which corresponds to a photographing view angle of the photographing unit connected to the stereo adapter, from the photographing unit and conforming the received illumination angle information to a characteristic of the optical path splitting optical system, thereby to control at least one of a projection view angle of the projecting means and an illumination angle of the illumination means.

* * * * *